A. NOBEL.
Improvement in the Manufacture of Nitro-Glycerine.
No. 4,817. Reissued March 19, 1872.
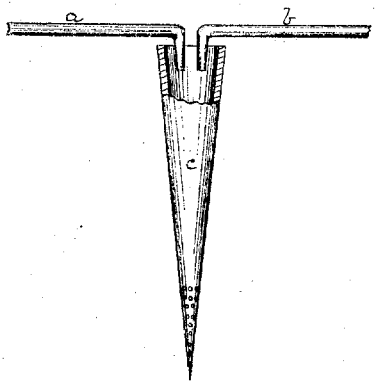
WITNESSES
Octavius Knight
Edm. F. Brown.
INVENTOR
Alfred Nobel
Assignee
The United States Blasting Oil Company
Geo. S. Shaffner,
President.

UNITED STATES PATENT OFFICE.

ALFRED NOBEL, OF HAMBURG, GERMANY, ASSIGNOR TO THE UNITED STATES BLASTING-OIL COMPANY, OF NEW YORK, N. Y.

IMPROVEMENT IN THE MANUFACTURE OF NITRO-GLYCERINE.

Specification forming part of Letters Patent No. 50,617, dated October 24, 1865; reissue No. 3,379, dated April 13, 1869; reissue No. 4,317, March 19, 1872.

DIVISION C.

*To all whom it may concern:*

Be it known that ALFRED NOBEL, of the city of Hamburg, Germany, has invented certain new and useful Improvements in the Manufacture of Nitro-Glycerine; and we do hereby declare that the following is a full, clear, and exact description thereof.

Previous to the invention of NOBEL, nitro-glycerine had, it is believed, been only made in small quantities in laboratories, as a chemical experiment, and not at all for commercial purposes, or for use in the arts, owing partly to the fact that while it was known to be a detonating or fulminating substance, there was no known method of utilizing it for blasting and other purposes for which explosives are employed; and partly, also, to the difficulty and supposed danger of combining the nitro-glycerine with the nitric and sulphuric acids otherwise than either drop by drop, or, at least, in very small quantities, and the supposed necessity of stopping the operation frequently to reduce the heat generated by the chemical reaction.

Nitro-glycerine is made by mixing glycerine with nitric acid and sulphuric acid, and afterward removing the surplus acids by decantation and washing. Previous to NOBEL'S invention, nitro-glycerine was made experimentally by mixing sulphuric acid and nitric acid in the proportions, usually of two parts of the former to one of the latter, in a vessel which was held in a frigorific bath, so as to keep the acid mixture very cold, care being taken that the temperature should, by no means, be allowed to rise above the zero of Celsius (32° Fahrenheit). The glycerine was then poured into the acids very cautiously, and in small quantities—the mixture being allowed time to cool between the times of adding the glycerine. It was then washed in water to separate the acids. This method, with slight variations, (such as altering the proportion of acids, and of first slowly mixing the glycerine in small quantities to the nitric acid, and when thoroughly mixed, adding slowly and cautiously the sulphuric acid) was substantially the only practical method then known for making nitro-glycerine.

NOBEL'S invention consisted in the discovery that nitro-glycerine could be made rapidly and in large quantities by the methods hereinafter described—the object being to secure a rapid and continuous mixing of streams of mixed acids and glycerine without creating sufficient reaction to produce oxidation. This he accomplished in two different methods, in one of which the glycerine is poured in a stream into a vessel of mixed acids, and in the other the mixed acids and glycerine are poured in separate streams, in the proper relative proportions, into a mixing-tube or vessel where they unite instantaneously, forming nitro-glycerine, which runs directly into a vessel of cold water. In the first method, the interior of the vessel containing the mixture of nitric and sulphuric acids, in proper proportions, is furnished with a long spiral or coiled tube, made either of lead or stone-ware, through which a constant stream of cold water is led. This effects a rapid cooling of the acids, and allows of a very rapid addition of glycerine, and, consequently, a very rapid preparation of nitro-glycerine.

When nitric acid of a high specific gravity is used for the preparation of nitro-glycerine, the temperature is much increased by the reaction. It is, therefore, better to introduce the nitric acid and glycerine gradually into the sulphuric acid, allowing the mixture to cool between each operation.

In the other method, the mixture of sulpuric and nitric acids is placed in one vessel and the glycerine in another; from each of these vessels a pipe conducts the streams of acids and glycerine into the mixing-tube. This part of the apparatus is shown in the accompanying drawing; *a* representing the pipe which conducts the mixed nitric and sulphuric acids from the acid-receptacle, and *b* the pipe which conducts the glycerine from its receptacle. These separate streams are led by their respective pipes into the mixing-tube *c*, which may be conveniently made of the shape of a funnel or an inverted cone, the lower or small end being perforated with a number of small holes, through which the mixture of acids and nitro-glycerine escapes into a tank of cold water placed below it. As these separate streams—one of mixed acids and the other of glycerine—enter the mixing-tube *c* they unite instantaneously, forming nitro-glycerine; which, running immediately into cold water, separates from the surplus acids and water, being insoluble in the latter. The water is maintained at a low temperature by any suitable means.

A modification of this apparatus may be used to insure the thorough mixing of the acids and glycerine by the use, instead of the conical mixing-tube *c*, of a tube which is put into rapid motion by a wheel or other contrivance, into the upper end of which the acids and glycerine are separately introduced, which will combine, as they flow through it, so instantaneously that the product (nitro-glycerine) is formed as quickly as they can pass through the tube. The same method will answer where a solution of nitrate of soda or potash in sulphuric acid is used instead of the mixed acids, being rapidly mixed up with glycerine before the sulphates of soda or potash separate by crystalization.

In the preparation of the acids for the manufacture of nitro-glycerine, instead of using the nitric acid of commerce, the mixture may be prepared as follows: If one part of nitrate of soda or potash be dissolved in three and a half parts of sulphuric acid, more or less, salts are formed corresponding to the respective formula ($NaO, 4SO_3+6HO$), ($KO, 4SO_3+6HO$). These salts being almost insoluble in the free acids at a low temperature, may be separated by a press—a free mixture of sulphuric and nitric acid remaining, which is very well adapted for the preparation of nitro-glycerine and other purposes. In reducing the quantity of sulphuric acid, so that the whole is required to form the above-mentioned double salts, no free acid other than the nitric remains, which, if the sulphuric acid used be of due concentration, is found to be pure monohydrate, ($NO_5,HO$,) which can thus be used without the usual deleterious distillation.

Having thus fully described the discovery and invention of ALFRED NOBEL in relation to the manufacture of nitro-glycerine, with sufficient clearness to enable those skilled in the arts and sciences to which they belong to make use of the same, what we claim as the discovery or invention of said NOBEL, and desire to secure by Letters Patent, in the name of the United States Blasting-Oil Company, as his assignee, is as follows:

1. The process of making nitro-glycerine by the continuous and rapid pouring together of separate streams of sulphuric and nitric acids and of glycerine, or of the glycerine into the mixed acids, as distinguished from the gradual and intermittent mixing of small quantities of glycerine with those acids, substantially as and for the purposes hereibefore described.

2. In making nitro-glycerine, where the mixing is effected in a vessel containing the mixed acids, the cooling of the acids previous to and during the introduction of the glycerine, by means of a worm or coil of pipe, through which a stream of cold water is run, substantially as and for the purposes hereinbefore described.

3. The process of making nitro-glycerine, by pouring together into a mixing-tube or funnel, separate streams of mixed acids and of glycerine, and discharging the resulting nitro-glycerine into a body of water, maintained at a low temperature by any suitable means, substantially as hereinbefore described.

4. The process of making nitro-glycerine by pouring together the streams of acids and of glycerine into a mixing-tube, to which rapid motion is communicated by any suitable means, through which tube the product is discharged into cold water, substantially as and for the purposes hereinbefore described.

In witness whereof, the said THE UNITED STATES BLASTING-OIL COMPANY, by TAL. P. SHAFFNER, President, have hereunto set their hand.

THE UNITED STATES BLASTING-OIL CO.,
By TAL. P. SHAFFNER.

Witnesses:
OCTAVIUS KNIGHT,
EDM. F. BROWN.